Oct. 16, 1962 S. A. SNINCAK 3,058,119
COLLAR INSERT
Filed July 2, 1959 2 Sheets-Sheet 1
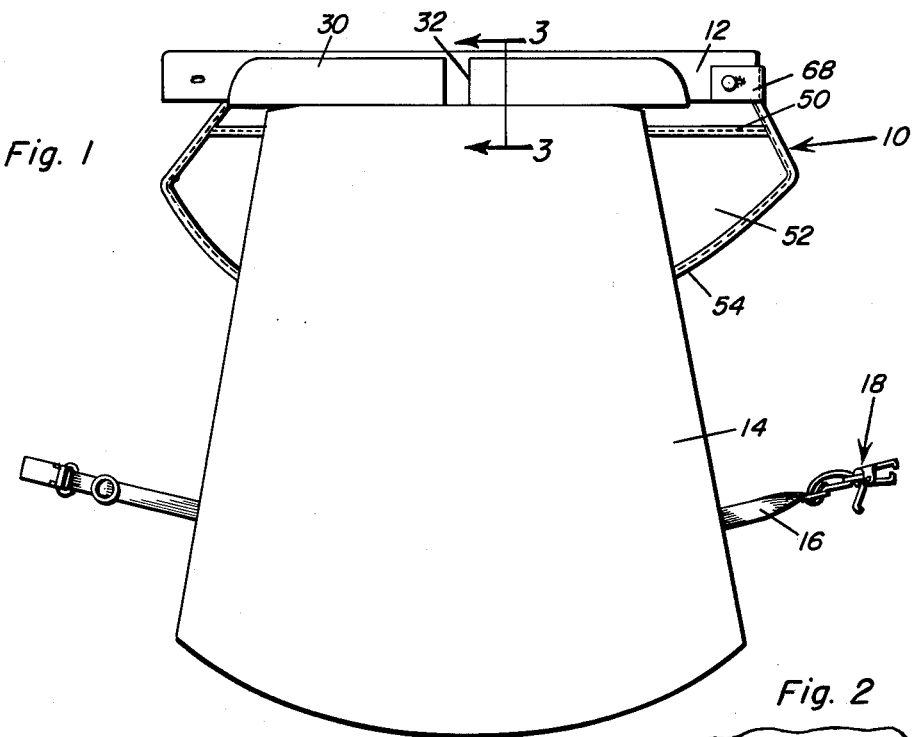
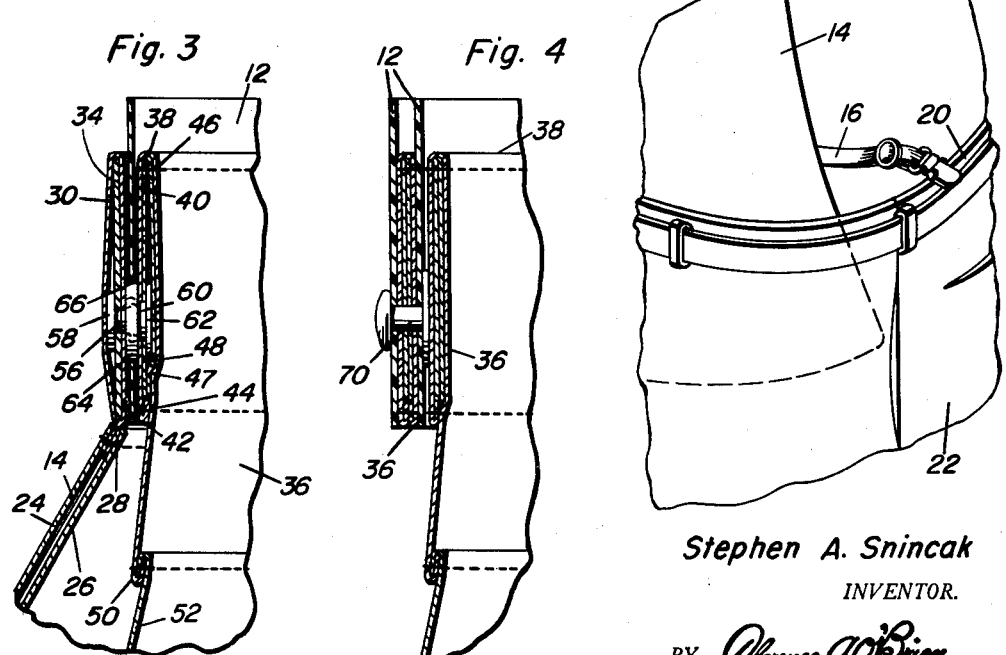
Stephen A. Snincak
INVENTOR.

Oct. 16, 1962 S. A. SNINCAK 3,058,119
COLLAR INSERT
Filed July 2, 1959 2 Sheets-Sheet 2
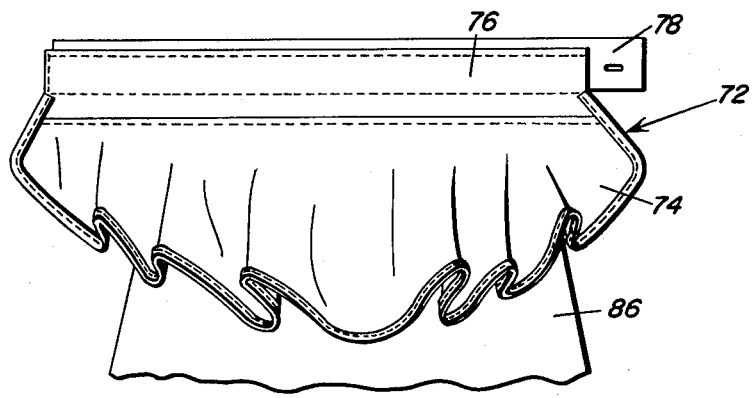
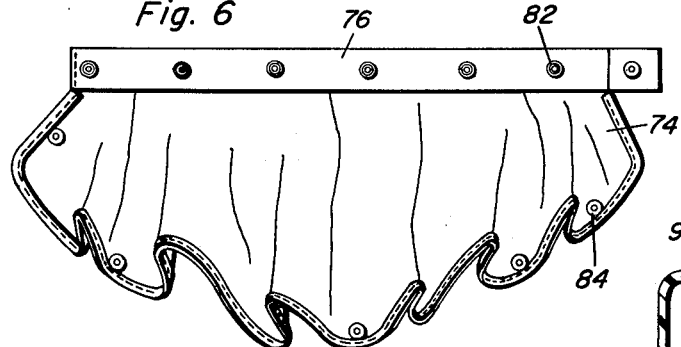
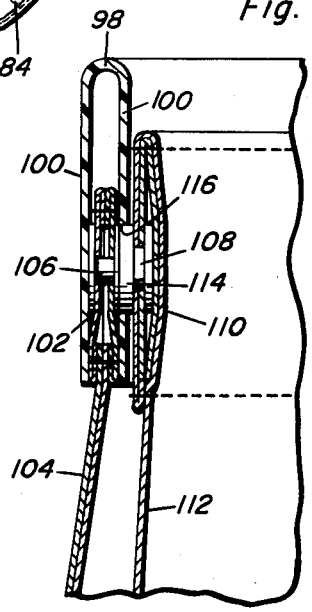
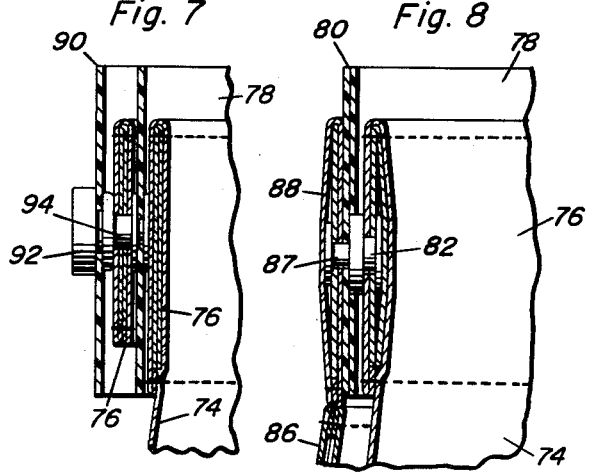
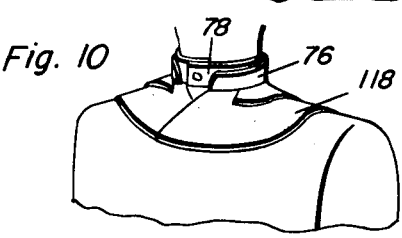
Stephen A. Snincak
INVENTOR.
BY *Clarence A. O'Brien*
*and Harvey B. Jacobson*
Attorneys

United States Patent Office 3,058,119
Patented Oct. 16, 1962

3,058,119
COLLAR INSERT
Stephen A. Snincak, Brooke Ave., Box A, Power, W. Va.
Filed July 2, 1959, Ser. No. 824,602
2 Claims. (Cl. 2—103)

The present invention generally relates to garment construction and more particularly to a collar insert for use in combination with priests' collars.

The primary object of the present invention is to provide an insert of washable absorbent material for positioning between the collar and the neck for absorbing perspiration in spacing the collar from the neck for rendering the collar more comfortable and providing an arrangement wherein the collar will be longer lasting since it will need to be laundered less with the insert being easily laundered.

In present-day collars used by clergymen, a plastic collar is often used. The plastic collar irritates the skin due to contact with the skin and when the temperature is relatively high, the plastic collar quite often causes heat rash and other rashes of the skin since the neck skin is usually quite sensitive. On the other hand, in winter when the temperature is cold, the plastic collar gets cold and extremely rigid and contracts and engages the skin of the neck thus also irritating the neck. Often, the plastic will crack and quite often the cracks will pinch the skin and small hairs which will be pulled everytime the wearer moves thereby causing considerable irritation and discomfort. In some attempts at solving this problem, collars of linen material have been provided but these are extremely difficult to launder and become easily soiled. There has also been provided a paper collar which is extremely inexpensive but of poor quality and also poor in appearance. The plastic collar is easy to clean since it may be cleaned merely by wiping with a damp cloth and perhaps with a small amount of soap. Thus the plastic collar is the most popular. Therefore, it is the primary object of the present invention to provide a collar insert which is attached to the collar and which includes a portion extending between the collar and the neck of the wearer with the insert being applicable to any size of neck or any kind of shirt worn by clergymen.

It is a further object of the present invention to provide various forms of the collar insert for one-ply, two-ply and three-ply collars together with a novel structural arrangement for attaching the inserts to the collars while leaving the inner surface of the collar relatively free of projections which would be quite uncomfortable to the wearer.

It is another object of the present invention to provide a collar insert which has the shirt front attached thereto which is of a novel structure.

A further important object of the present invention is to provide a collar insert which is relatively inexpensive to manufacture, easy to attach and detach, adapted for utility with various types of collars by slight modifications, comfortable to wear and easy to use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of a collar insert illustrating the shirt front attached thereto;

FIGURE 2 is a partial perspective view illustrating the lower end of the shirt front and the manner in which it is attached to the trousers of the wearer;

FIGURE 3 is a vertical sectional view taken substantially upon a plane passing along section line 3—3 of FIGURE 1 illustrating the orientation of components;

FIGURE 4 is a sectional view of the overlapping end portions of the collar insert of the invention;

FIGURE 5 is a plan view of another form of the invention;

FIGURE 6 is a plan view of the insert of FIGURE 5 as viewed from the inner surface;

FIGURE 7 is a detail sectional view illustrating the manner of connecting the ends of the collar and the collar insert;

FIGURE 8 is a sectional view similar to FIGURE 3 illustrating the manner of securing the collar insert and shirt of FIGURE 5 to the collar;

FIGURE 9 is a sectional view illustrating another manner of securing the collar insert to the collar; and FIGURE 10 is a partial perspective view illustrating the rear view of the collar and collar insert illustrating the overlapping structure of the insert.

Referring now specifically to the drawings, the numeral 10 generally designates the collar insert of the present invention which is associated with a collar 12 and which includes an enlarged shirt front 14 that may be of any suitable cloth or material. The edges of the shirt front diverge and the lower edge may be curved or formed in any desired manner. Each edge of the shirt front 14 is provided with an adjustable strap 16 adjacent the bottom edge thereof with the strap having attached thereto a clamp member generally designated by the numeral 18 which is adapted to clampingly engage the waistband 20 of a pair of trousers 22 towards the rear portion thereof whereby the shirt front 14 will be held down and in spread condition by attachment of the clamp members 18 with the waistband 20.

As shown in FIGURE 3, the shirt front 14 is constructed of an outer layer of material 24 and an inner layer of material 26 secured together by stitching 28 at the upper edge thereof. Extending upwardly from the upper edge of the shirt front 14 is a loop or hem 30 retained between layers 24 and 26 by stitching 28 as shown in FIGURE 3. The hem 30 is provided with a central vacant area or open area 32 wihch is disposed exteriorly of the collar 12. The hem 30 is provided with a stiffening reinforcing member 34 which maintains the hem 30 in parallelism with the collar 12 and it is pointed out that the hem 30 does not extend completely to the upper edge of the collar 12. Normally, the collar 12 is white and the shirt front 14 and hem 30 may be another color such as black.

Disposed against the inner surface of the collar 12 is an insert 36 of fabric material which is reversely curved at the upper edge which forms a reverse bend 38 and then extends downwardly as an inner panel or layer 40. The inner panel 40 extends downwardly and terminates at the bottom edge of the collar 12 and is reversely bent at this point as indicated by numeral 42 and secured by stitching 44. The upper reverse bend 38 is also secured by stitching 46. Disposed intermediate the insert 36 and the panel 40 is a pair of reinforcing panels 47 and 48 for reinforcing the portion of the insert disposed against the inner surface of the collar 12. The portion of the insert 36 extending below the collar 12 is provided with a folded seam 50 and a bottom section 52 attached by the seam and provided with an arcuate lower edge formed by a bias tape 54.

A separable fastener is provided at a plurality of points for holding the shirt front 14 to the collar 12 and to the insert 36. The fastener includes a portion 56 having a head 58 received between the reinforcing member 34 and the panel 30 with the shank extending through the reinforcing member 34 and the inner panel of the hem 30. The other portion of the fastener is designated by numeral 60 and includes a head 62 received between the reinforcing panels 47 and 48 with the juncture between the fastening portions 56 and 60 being a socket connector 64 received in an opening 66 in the collar 12. The separable portions 58 and 60 of the fastener permits easy removal of the shirt front and insert 36 from the collar 12. Further, the seam 50 may be eliminated and one end of the insert 36 may be reversely folded over the end of the collar 12 as indicated by numeral 68. Also, the insert 36 may be constructed of material such as broadcloth, batiste or non-cling slip cloth or the like which are good absorbents and easy to wash and in the winter time will keep the neck warm. It is pointed out that the insert 36 protects the neck of the wearer from engagement with the collar at the bottom end thereof and presents a smooth surface to engage the neck. The orientation of the socket 64 within the collar 12 reduces the over-all thickness of the device.

FIGURE 4 illustrates a collar button 70 going through the overlapping ends of the collar 12 and also through one end portion of the insert 36 which here does not extend below the edge of the collar 12.

FIGURES 5–8 illustrate another form of the invention generally designated by numeral 72 which includes a generally partial circular panel of material 74 having a longitudinal upper edge portion 76 for detachable engagement with the collar 78 which is shown in FIGURE 8 and which is reversely bent at the upper edge into two plys with the reverse bend designated by numeral 80. The longitudinal edge portion 76 is provided with a plurality of snap fastener elements 82 and the panel 74 is also provided with snap fastener elements 84 along the bottom edge therof, see FIGURE 6, for engagement with corresponding snap fastener elements on a shirt front 86. The snap fastener elements 82 are secured to the edge portion 76 by virtue of having a portion thereof received between the inner and outer layers of the longitudinal edge portion 76 for engaging other snap fastener elements 87 extending through apertures in the collar 78 and being secured to and between the layers of a hem portion 88 of the shirt front 86. Other than the difference in the orientation of the snap fastener elements, the remainder of the structure is substantially the same as that defined in connection with FIGURE 3.

In FIGURE 7, there is shown the manner of securing the overlapping ends of the collar 78 together with the ends of the collar in this case being of one-ply construction and designated by numeral 90. One end 90 of the collar 78 is provided with a snap fastener element 92 for engagement with a snap fastener element 94 carried by the other end of the collar and also receiving the member 76.

FIGURE 9 illustrates another version of the invention in which the collar 98 is reversely folded to form two separate layers 100 which receives the shirt front hem member 102 therebetween with the shirt front 104 suspended therefrom. The member 102 is provided with snap fasteners 106 which are detachably engaged with snap fasteners 108 in a hem portion 110 of the insert 112 in a manner similar to FIGURE 3. The socket connection 114 between the snap fastener elements 106 and 108 is received within a hole or aperture 116 in the inner layer of the collar 98.

FIGURE 10 illustrates the manner in which the collar insert is provided with shoulder pieces 118 which have the edges thereof overlapping when being worn.

Various types of fastener elements may be provided for the shirt front member and for the insert and for the overlapping ends of the collar with it being primarily necessary to provide a smooth interior surface for the collar insert. The smooth interior surface prevents chafing and other discomfort caused by the generally stiff and rigid plastic collar and also absorbs perspiration in the summer to prevent irritation and also provides a warm surface for engagement with the neck during the winter and prevents the collar from pinching the skin of the wearer in the event the bottom edge thereof becomes broken by a crack or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a semi-rigid collar, an insert comprising an enlarged flexible panel of launderable fabric material having a free lower edge adapted to engage the shoulder area of a wearer, a hem at the upper edge of said panel, said hem including two layers with one layer being continuous with the panel and the bottom edge of the other layer being attached thereto, a multi-layer reinforcing panel disposed within the hem and secured thereto by stitching to prevent relative movement between the hem and the reinforcing layers, said hem overlying the major portion of the interior surface of the semi-rigid collar with the upper edge of the hem defining a rolled edge for engagement with the neck of a wearer to prevent discomfort, and snap fastener elements attached to said hem, said snap fastener elements including inner and outer flange portions engaging the exterior surface of the outer layer of the hem and the interior surface of the outer layer of the reinforcing member respectively thus retaining the snap fastener elements securely in place but retaining the continuity of the inner layer of the hem and the inner layer of the reinforcing member.

2. The structure as defined in claim 1 together with a shirt front member having an enlarged shirt front panel and a hem at the upper end thereof having inner and outer layers, a reinforcing panel in said hem, and snap fastener elements attached to said reinforcing panel in the hem on the shirt front member and extending only through the inner layer of the hem on the shirt front member for detachable engagement with the snap fastener elements carried by the insert hem, said collar having openings through which the snap fastener elements pass thus securing the hems against the inner and outer surface of the collar with none of the fastener elements being revealed to the interior or exterior of the garment.

References Cited in the file of this patent

UNITED STATES PATENTS

| 1,446,948 | Taylor | Feb. 27, 1923 |
| 1,804,346 | Kirschenbaum | May 5, 1931 |
| 2,102,198 | Dickman et al. | Dec. 14, 1937 |
| 2,394,717 | Rendall | Feb. 12, 1946 |
| 2,451,364 | Spector | Oct. 12, 1948 |
| 2,688,136 | Freedman | Sept. 7, 1954 |
| 2,875,446 | Snincak | Mar. 3, 1959 |

FOREIGN PATENTS

| 10,375 | Great Britain | May 1, 1912 |
| 1,059,315 | France | Nov. 10, 1953 |